United States Patent [19]
Lindenmeier et al.

[11] Patent Number: 5,905,469
[45] Date of Patent: May 18, 1999

[54] WINDOWPANE ANTENNA INSTALLATION

[75] Inventors: Heinz Lindenmeier, Planegg, Germany; Andreas Fuchs, Orion, Mich.

[73] Assignee: Fuba Automotive GmbH, Bad Salzdetfurth, Germany

[21] Appl. No.: 08/794,898

[22] Filed: Feb. 5, 1997

[30] Foreign Application Priority Data

Apr. 1, 1996 [DE] Germany ............................ 196 12 958

[51] Int. Cl.⁶ ....................................................... H01Q 1/32
[52] U.S. Cl. ........................................... 343/713; 343/704
[58] Field of Search .................................. 343/713, 704; H01Q 1/32

[56] References Cited

U.S. PATENT DOCUMENTS

| | | | |
|---|---|---|---|
| 4,914,446 | 4/1990 | Lindenmeier et al. | 343/704 |
| 5,029,308 | 7/1991 | Lindenmeier et al. | 343/713 |
| 5,083,134 | 1/1992 | Saitou et al. | 343/173 |

FOREIGN PATENT DOCUMENTS

| | | |
|---|---|---|
| 124055 | 4/1984 | European Pat. Off. . |
| 3410415 | 9/1985 | Germany . |
| 3618452 | 12/1987 | Germany . |

*Primary Examiner*—Hoanganh Le
*Attorney, Agent, or Firm*—Collard & Roe, P.C.

[57] ABSTRACT

An antenna installation adapted for long-/medium-/short wave and television frequency ranges for use in a motor vehicle windowpane having a conductive window frame. The installation includes an antenna conductor disposed on the windowpane, an antenna conductor connection point located near the window frame and within the zone of the windowpane adhesive, which acts as a dielectric, and an electrical unit mounted on the windowpane. A receiving and transmitting unit is provided and an HF-cable is connected to the output contacts of the electrical unit at one end and to the receiving and transmitting unit at the other end. A flat capacitive element having a conductive surface located within the zone of the HF-mass reference point and extending along the edge of the windowpane within the windowpane adhesive provide the connection between the electrical unit and the antenna conductors.

16 Claims, 5 Drawing Sheets

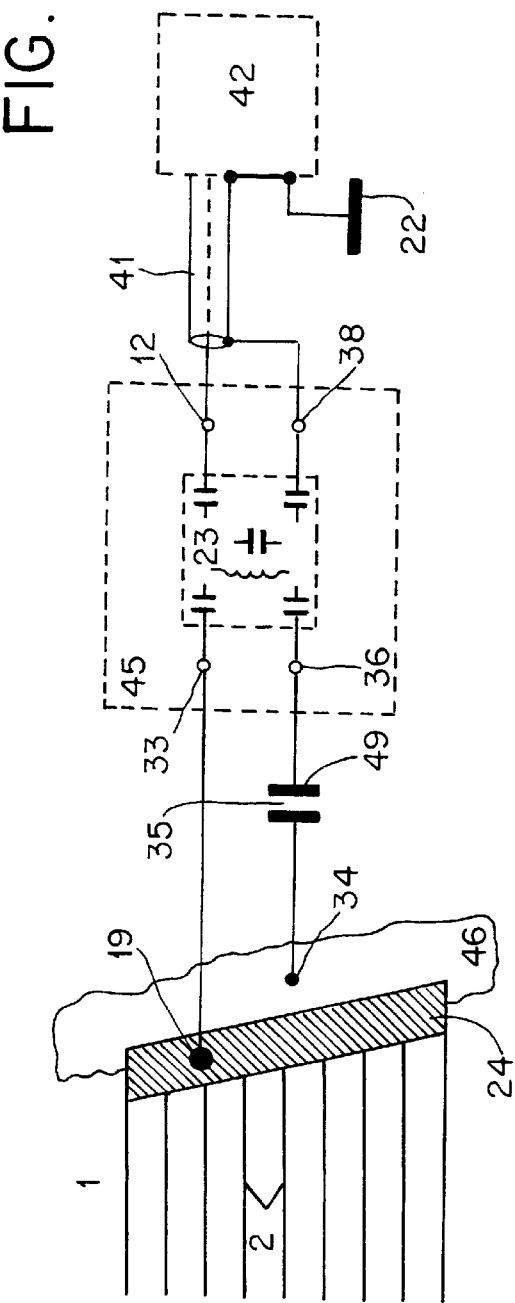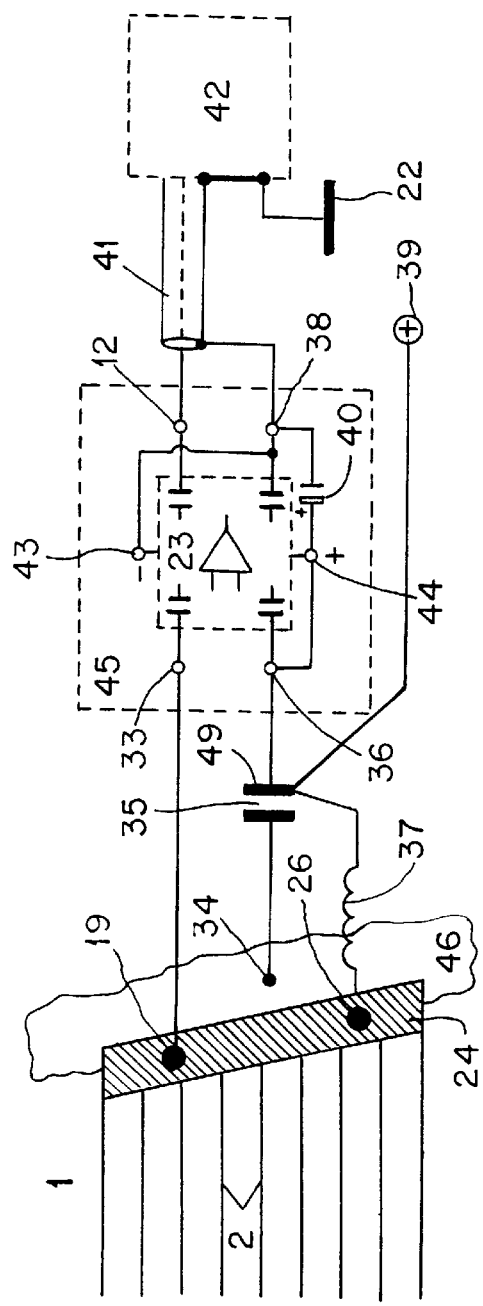

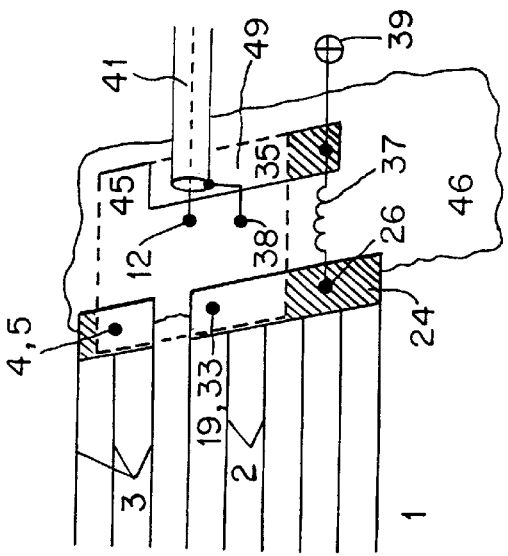

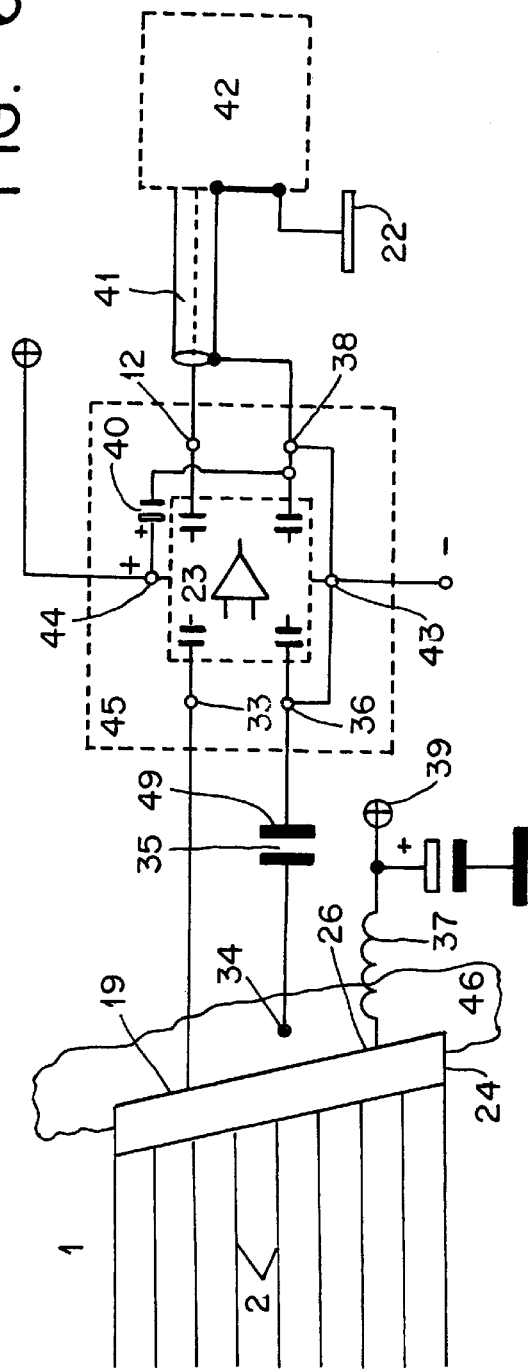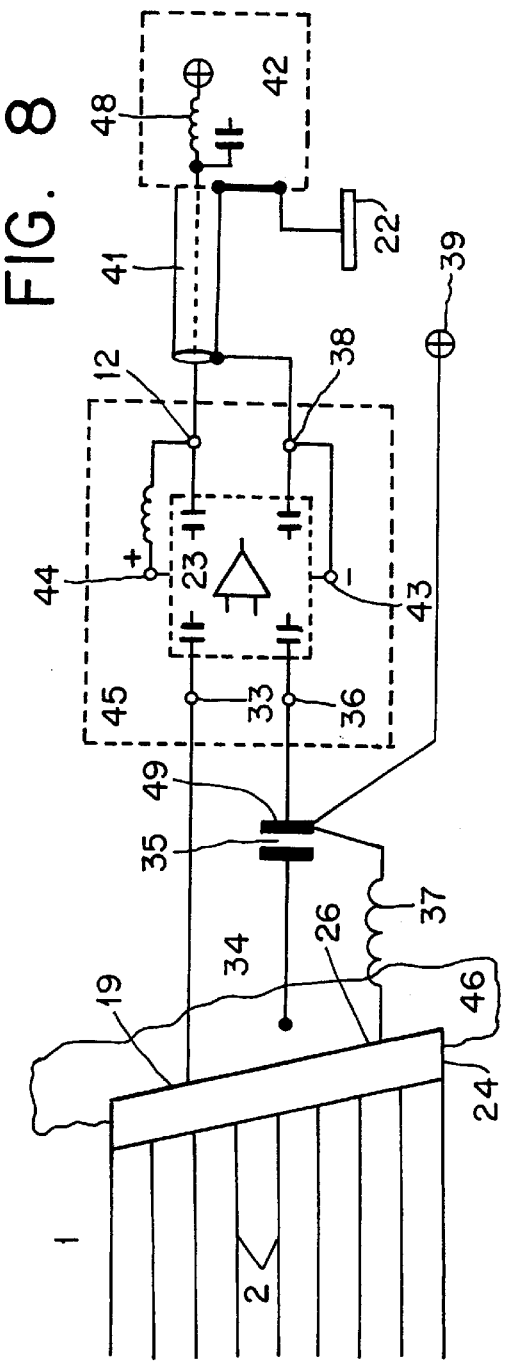

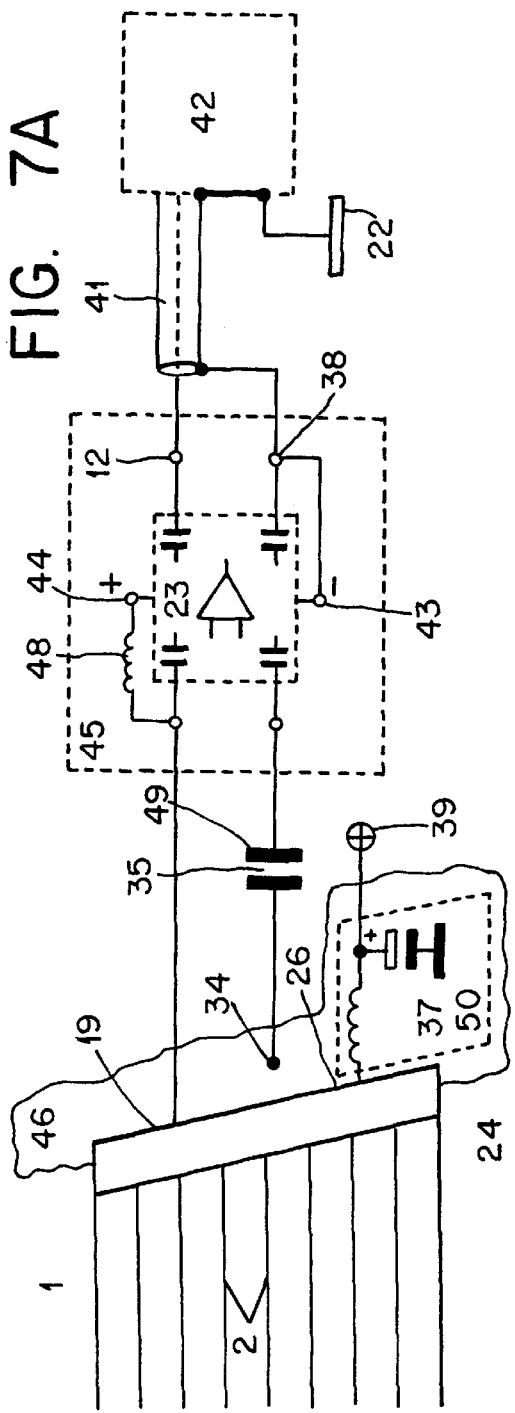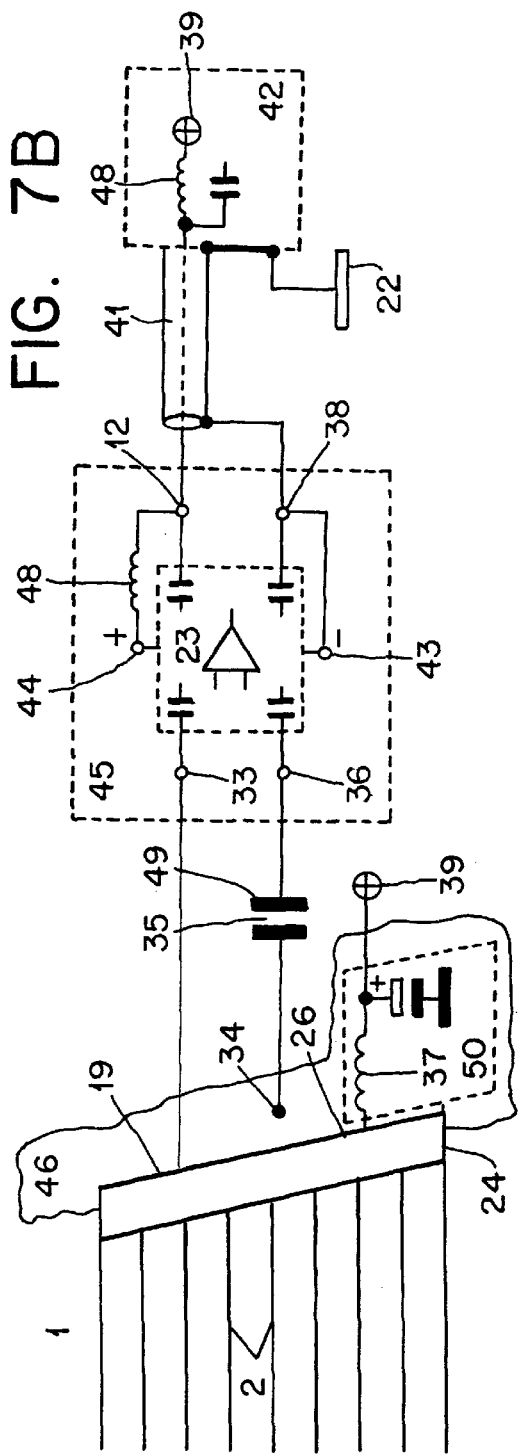

WINDOWPANE ANTENNA INSTALLATION

BACKGROUND OF THE INVENTION

1. Field of the Invention

The invention relates to a windowpane antenna for use in motor vehicles. More particularly, it relates to a windowpane antenna installation operating in the frequency range for the meter and decimeter wave bands and being used for ultra short-wave and long-wave, medium-wave and short-wave radio reception, as well as terrestrial television reception.

2. The Prior Art

Antennas of this type are described in EP 0 124 055 B1, DE-3410415 A1, as well as De-3618452, among others. With all of the prior art antennas, antenna conductors are printed onto the windowpane, or embedded in laminated glass. In all of these antennas, the antenna conductor connection points are located on the edge of the windowpane and are installed in a conductive windowpane frame represented by the conductive body of the vehicle. According to current technology, the antenna connection points are connected to an electrical unit via feed lines that are made as short as possible. The mass connection of the electrical unit is connected in the shortest possible way to the conductive frame of the rear windowpane.

The electrical unit, which is frequently an antenna amplifier, is connected at its output to the HF-cable, which further transmits the signals to the receiver. Generally, the electrical unit is mechanically fastened near the mass connection on the body of the vehicle. Frequently, the mass connection to the body of the vehicle is established via the installed connection as well.

This method of mounting the electrical unit on the body of the vehicle is both expensive and complex. The method also requires fastening means such as bolts or holes for fastening the unit. It is much more economical and more advantageous for the production of motor vehicles if an electrical unit, designed as a miniaturized unit, is mounted on the edge of a windowpane. Sufficient space is available for the miniaturized unit within the zone of the black printing on the edge of the window. In designing an antenna installation that can be used for high-frequencies, it is generally necessary to connect the high-frequency impedance, which develops between the antenna conductor connection point and an adjacent HF-mass reference point, in a defined way in terms of high frequency to the input of the electrical unit.

SUMMARY OF THE INVENTION

It is therefore and object of the invention to provide a windowpane antenna installation for motor vehicles which includes a high frequency connection member between the antenna conductors on the windowpane and the HF-cable.

It is another object of the invention to provide a windowpane antenna installation for motor vehicles that includes an electrical unit mounted on the windowpane.

It is a further object of the invention to provide a windowpane antenna installation for motor vehicles that permits a mass connection to the body of the vehicle, and is not within immediate proximity of the mounted electrical unit.

Yet another object of the invention is to provide a windowpane antenna installation that overcomes the drawbacks of the prior art and is inexpensive and simple to manufacture.

These and other objects of the invention are accomplished by an antenna installation having an antenna conductor disposed on the windowpane, an antenna conductor connection point located near the window frame and within the zone of the windowpane adhesive, which acts as a dielectric, and an electrical unit mounted on the windowpane. The electrical unit has a first input contact, a second input contact and a plurality of output contacts. The first input contact is connected to the antenna conductor connection point.

The installation includes a receiving and transmitting unit, and an HF-cable connected to the output contacts of the electrical unit at one end and to the receiving and transmitting unit at the other end. The invention also includes a low-resistance flat capacitive element having a conductive surface located within the zone of the HF mass reference point and extending along the edge of the windowpane within the windowpane adhesive. The capacitive element is spaced a small distance away from and is electrically separated from the antenna conductor connection, and connects the second input contact to the HF mass reference point.

Such an antenna has the special advantage that electrical unit can be electrically and mechanically connected with the HF-cable, and can be incorporated into the vehicle as a unit that is mechanically detached from the body of the vehicle. This makes it possible to mechanically join the electrical unit with the HF-cable to the windowpane, and to glue the windowpane into the metallically conductive frame when the vehicle is manufactured. Then the HF-cable can be installed in the vehicle between the receiver and the transmitter. The electrical connection required when using active construction elements in the electrical unit can then be established at any desired site in the vehicle that is suitable for such a connection between the shielded conductor of the coaxial HF-cable, and the mass of the vehicle. By connecting the HF-cable to the receiving unit, such mass connection necessarily takes place via the mass connection of the receiver itself. Electrical unit can be mounted also in a particularly simple way after the window has been installed in that the window is provided with detachable contact connections, into which the corresponding countercontacts of the electrical unit can be clipped.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2a shows the antenna installation according to the invention;

FIG. 2b shows a receiving antenna installation according to the invention;

FIG. 3 shows a long-/medium-/short-wave and ultra-short wave receiving antenna installation according to the invention;

FIG. 4 shows the mechanical/electrical structure of the electrical unit of the antenna according to FIG. 3;

FIG. 5a shows the design of the flat capacitive element comprising of the conductive surface disposed on the windowpane, the pane adhesive and the conductive window frame;

FIG. 5b shows the shape of the conductive area and the preferred connection point for the second input contact in the center of the area.

FIG. 5c shows a meander shaped design of the conductive area with the connection point for the second input contact at one end and with no load at the other end.

FIG. 6 shows the antenna installation according to the invention with a heatable rear windowpane and separately fed heating current and separate power supply feed for the antenna amplifier;

FIG. 7a shows an alternative embodiment of the antenna according to FIG. 6;

FIG. 7b shows an alternative embodiment of the antenna according to FIG. 7a; and FIG. 8 shows an alternative embodiment of the antenna according to FIG. 2b.

DETAILED DESCRIPTION OF THE PREFERRED EMBODIMENT

Figure 1:
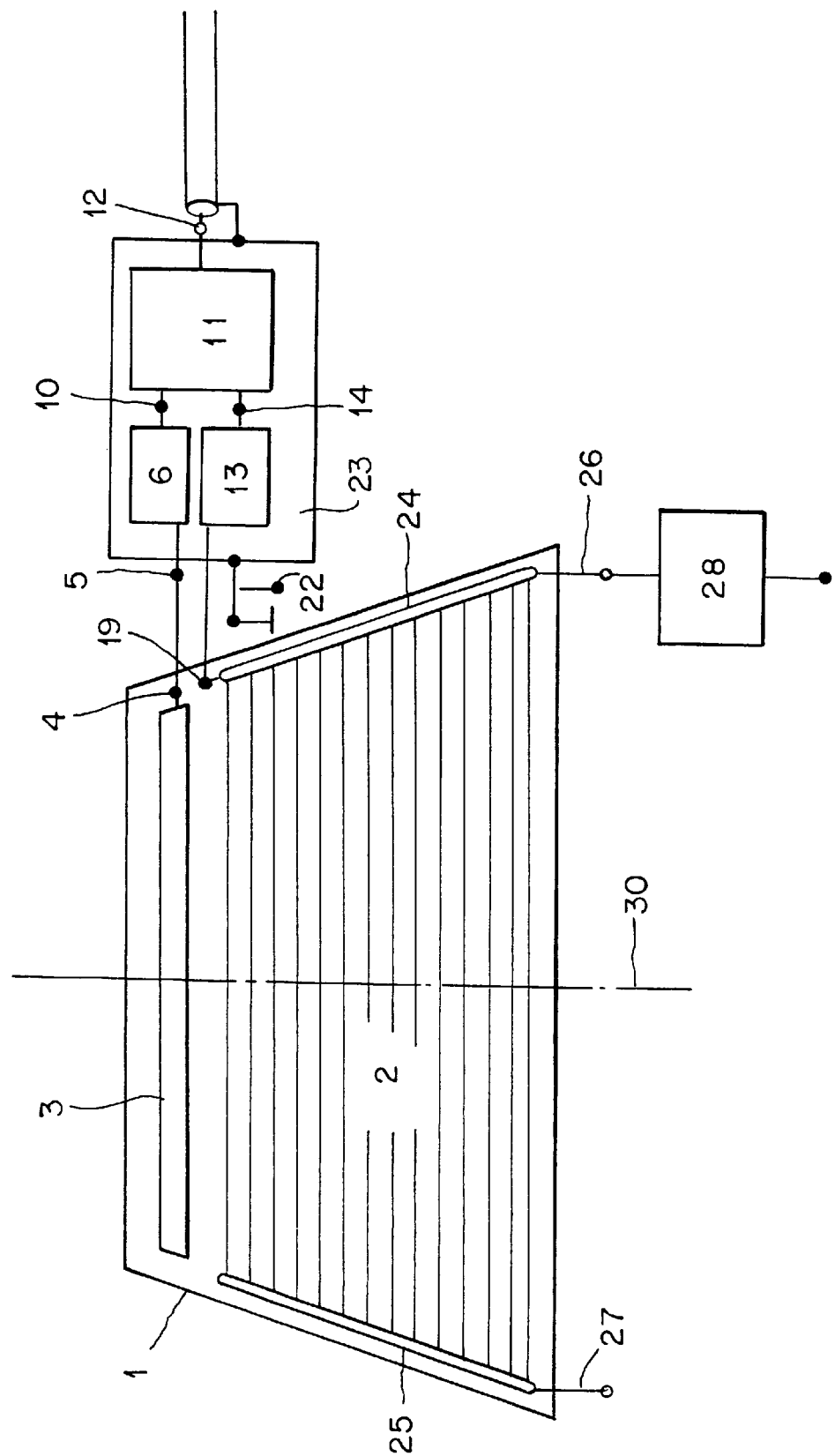
FIG. 1 shows a prior art antenna with an antenna amplifier denoted by a mass connection to the body of the vehicle.

Referring now in detail to the drawings and, in particular, to the prior art of FIG. 1, there is shown a windowpane 1, having conductors 2 coupled to a bus bar 24 on one side. A second conductor 3 is provided and includes a conductor connection point 4. An antenna amplifier 23 has a first input 5 coupled to the antenna conductor connection point 4 which feeds an amplifier 6 within amplifier 23. Antenna amplifier 23 is connected to the vehicle mass as a point 22. A signal device 13 is connected to antenna conductor connection point 19 on bus bar 24. The outputs of amplifier 6 and signal device 13 are fed into frequency switch 11, and then fed to output 12 for transmission to a receiver. A heating system 28 is coupled to bus bar 24 via connection point 26.

FIG. 2a shows a schematic diagram of the antenna according to the invention. The high-frequency mass connection for electrical unit 45 and its second input contact 36 is made using a flat capacitive element 35. The invention shown in FIG. 2a, therefore solves the problem of creating a sufficiently low-resistance, high-frequency connection between HF-mass reference point 34, which is present on the conductive rear windowpane frame 46, and second input contact 36. According to the invention, this is accomplished using the exemplified embodiments of conductive surface 49 of flat element 35 as shown in FIGS. 5a to 5c.

Because of the relatively high dielectric constant of the commonly-used windowpane adhesive, the high-frequency connection can be designed to be of very low impedance. For example, conductive surface 49 can be produced with a length 53 of 5–7 cm and with a width 54 of about 1 cm. Second input contact 36 can be provided at any desired point on this surface. If a particularly low impedance capacitive connection is desired, conductive surface 49 can be designed as a conduction resonance structure and length 53, for example, can be selectively adjusted until it has an electrically active length of a quarter wavelength jointly with conductive windowpane frame 46. In addition, the connection point for second input contact 36 is selected on HF-transmission unit 23 at one end of the surface. To reduce the geometric length 53 of conductive surface 49, a meander structure can be selected as shown in FIG. 5c. This embodiment, with no load at one end, provides for a resonance short circuit at its other end, where second input contact 36 is connected. The required band width of the resonance can be adjusted across the width of the selected meander lines.

FIG. 3 shows an example of an active receiving antenna for the long-/medium-/short-wave range. Electrical unit 45 contains an HF-transmission unit 23 with a long-/medium-/short-wave amplifier 6 and an ultra-short wave amplifier. In this embodiment, the heating current feed from heating system 50 takes place at any desired point 26 on bus-bar 24 via high resistance inductor or coil 37. The direct-current feed for the amplifier takes place via a direct-current (DC) source in receiver 42 and via the inside and outside conductors of the cable 41. Electrical unit receives DC supply via positive and negative terminal connection points 44 and 43, respectively.

FIG. 3 shows a second signal path 6 through HF-transmission unit 23. Second signal path 6 has an input contact 5 that is directly connected to a second antenna connection point 4 which is coupled to additional antenna conductors 3. The output of second signal path is through output contact 12. Second signal path 6 provides a signal path for the low frequency signals that are either not received or are filtered from the high frequency path designated by input contacts 33, 36 and output contacts 12, 38.

FIG. 4 shows the mechanical/electrical structure of an antenna according to the invention, with a design for long/medium-/short-wave and ultra-short wave similar to the one in FIG. 3. In this embodiment, electrical unit 45 has disconnectable pressure contacts for connecting HF-mass reference point 34 and second input contact 36, as well as connecting antenna conductor connection point 19 and first input contact 33. Here, HF-cable 41 is both electrically and mechanically connected with electrical unit 45. Thus, the electrical unit 45 can be mounted on window 1 by simply pressing it onto the window surface. The mechanical securing takes place via the pressure contacts as well. Similar to the method shown in FIG. 3, the heating current feed takes place via high resistance inductor 37, which is interconnected between conductive surface 49 and an adjacent point on bus-bar 24 of the rear windowpane heater. In this configuration, high resistance inductor 37 thus can be incorporated by soldering when the glass is manufactured. The heating current supply from the DC supply 39 can take place via the feed line, which is separately soldered to conductive surface 49.

The feed line od DC supply 39, as well as the shielded conductor of coaxial HF-cable 41 are, with respect to high frequency, disposed parallel with flat capacitive element 35 toward the body of the vehicle. However, the high-frequency shunt, due to the inductance of the conductor, is ineffective if the capacitance value formed by conductive surface 49 toward conductive window frame 46 is designed to be of sufficiently low resistance. In the higher-frequency ultra-short wave range, this is easily achievable by the design of conductive surface 49. This way, second input contact 36 of electrical unit 45 locates its HF-mass reference point 34 in the desired site on conductive window frame 46. This is not necessarily true in the low-frequency long-/medium-/short-wave ranges. In these ranges, the capacitive antenna conductors supply a receiving voltage versus the body of the vehicle, whereby the mass point can be defined to have low losses because of the larger wavelengths in these ranges. If HF-mass reference point 34 is to be active at the defined point in these ranges as well, the high-frequency shunt can be made ineffective in a further embodiment of the invention by adding ferrite material (e.g. punched core material) around the outer conductor of HF-cable 41 and around the line for feeding the heating current.

FIG. 2b shows an advantageous variation of an antenna, formed by the heating conductors, as it is shown in the ultra-short wave part in FIG. 4. Here, the feed of the heating current takes place as described in connection with FIG. 4.

For smoothing interference pulses, which are superimposed by transient pulses of the voltage, capacitor 40 is switched between the positive direct-current connection (plus) 44 and second output contact 38. Thus, interference pulses or noise of lower frequency can be filtered out in this way. This is important especially when the antenna is designed as a long-/medium-/short-wave antenna similar to the one shown in FIGS. 3 and 4.

In an advantageous embodiment of the invention shown in FIG. 6, the heating direct-current from DC supply 39 is fed via the high-resistance inductor 37 of bus-bar 24. The DC supply for electrical unit 45 takes place separately on positive terminal 44 via a line which can be installed parallel with the HF-cable 41. Screening or filtering of the voltage can take place via capacitor 40.

FIG. 7a shows an antenna similar to the one in FIG. 6. However, the feed of direct current for the amplifier is obtained from the DC voltage potential of bus-bar 24 applied to first input contact 33, and fed to the amplifier via positive terminal 44 of HF-transmission unit 23 and inductor 48. FIG. 7b shows another variation for feeding the amplifier direct current via the internal conductor of HF-cable 41 and a DC source 39, which is provided in the receiver. FIG. 7b shows the same direct-current feed of the amplifier as shown in FIG. 7a, however, via coaxial HF cable 41.

FIG. 8 shows an antenna as the one described in connection with FIG. 2b. However, the direct current is fed via coaxial HF-cable 41 as described in connection with FIG. 7b.

While several embodiments of the present invention have been shown and described, it is to be understood that changes and modifications may be made thereunto without departing from the spirit and scope of the invention according to the appended claims.

What is claimed is:

1. An antenna installation adapted for long-/medium-/short wave and television frequency ranges for installation in a motor vehicle windowpane having a conductive window frame and windowpane adhesive, comprising:
    at least one antenna conductor disposed on the windowpane;
    an antenna conductor connection point located near the window frame and within the zone of the windowpane adhesive, said adhesive acting as a dielectric;
    an electrical unit mounted on the windowpane and having a first input contact, a second input contact and a plurality of output contacts, said first input contact being connected to the antenna conductor connection point;
    a receiving and transmitting unit;
    a HF-cable having one end connected to one of said plurality of output contacts of the electrical unit and an opposite end connected to said receiving and transmitting unit, said HF-cable and said receiving and transmitting unit having an impedance;
    a HF-mass reference point disposed on the conductive window frame, said antenna conductor having an impedance acting between said antenna connection point and the HF-mass reference point;
    a low-resistance flat capacitive element comprising a conductive surface located within the zone of the HF-mass reference point and extending along an edge of the windowpane within the windowpane adhesive, said capacitive element being spaced apart from and electrically separated from the antenna conductor connection point, said element connecting said second input contact to the HF-mass reference point; and
    wherein, the flat capacitive element is a sufficiently low-resistance, high-frequency connection between said HF-mass reference point and said second input contact to give the antenna installation the special advantage of allowing said electrical unit to be electrically and mechanically detached from the body of the vehicle.

2. The antenna installation according to claim 1, wherein said electrical unit further comprises an adaptation network acting as an HF-transmission unit (23), said adaptation network comprising passive electrical construction components for matching the impedance of said antenna conductors (2) between the antenna conductor connection point (19) and the HF-mass reference point (34) to the impedance of the HF-cable (41) and receiving and transmitting unit, said HF-transmission unit having a DC supply.

3. The antenna installation according to claim 2, wherein said at least one antenna conductor (2, 24) comprises a first antenna conductor part formed by parallel heating wires (2) and a second antenna conductor part formed by a bus-bar (24) of a windowpane heating system, said antenna conductor connection point (19) being arranged on the bus-bar (24).

4. An antenna installation according to claim 3, further comprising:
    a high-resistance inductor (37) interconnected between said bus-bar (24) and said conductive surface (49) of the flat capacitive element;
    an electrical conductor (39) connected to said conductive surface (49) for feeding heating current to said conductive surface (49), said electrical conductor (39) having a high frequency resistance;
    a shielded conductor disposed within said HF-cable (41); and
    wherein the high frequency resistance of the electrical conductor is greater than that of the flat capacitive element and wherein the HF-transmission unit (23) is electrically connected to the vehicle via the shielded conductor of said HF-cable (41).

5. The antenna installation according to claim 4, wherein said DC voltage supply of said HF-transmission unit is generated by a DC voltage potential applied to said second input contact (36) through said conductive surface (49).

6. An antenna installation according to claim 5, further comprising a capacitor (40) having high capacitance value and being interconnected between said second input contact (36) and the shielded conductor on the HF cable (41), said capacitor being adapted to filter interfering voltage pulses of low frequency in an onboard voltage supply.

7. The antenna installation according to claim 4, further comprising:
    an external conductor separate from said HF-cable (41) for electrically connecting the DC supply of said HF-transmission unit (23) to the HF-mass reference point 34 (vehicle mass).

8. The antenna installation according to claim 4, wherein said DC supply of said HF-transmission unit (23) comprises a positive connection point (44) and a negative connection point (43), and further comprising:
    an inductor (48) connected between said first input contact (33) and said positive connection point (44), said negative connection point (43) being electrically connected to HF-mass reference point 34 (vehicle mass) via said shielded conductor if said HF-cable (41).

9. The antenna installation according to claim 1, wherein said electrical unit (45) further comprises active electronic components adapted to form an active receiving antenna for transmitting signals received through said HF-cable to the receiving unit (42).

10. The antenna installation according to claim 1, further comprising:

additional antenna conductors (3) disposed on said windowpane (1);

a second antenna connection point (4) adjacent said first antenna connection point (19), said additional conductors (3) being connected to said second connection point (4);

said HF-transmission unit (23) further comprising:

a first signal path defined between said first and second input contacts (33, 36) and said output contacts (12, 38), said first signal path being adapted to receive and transmit high frequency signals; and a second signal path (6) having an input contact (5) connected to said second antenna connection point (4) and an output connected to said HF-cable (41), said second signal path being adapted to receive and transmit low frequency signals.

11. An antenna installation according to claim 1, wherein the electrical unit (45) has a flat shape and further comprises contact points arranged on a side facing the windowpane (1), said contact points being adapted to directly contact said antenna conductor connection points (19) and said conductive surface (49) and thereby fasten said electrical unit to the windowpane (1).

12. An antenna installation according to claim 11, wherein said contact points are pressure contacts, and further comprising countercontacts soldered onto said antenna conductors (2, 24), such that a disconnectable connection is formed between the electrical unit (45) and the windowpane (1).

13. The antenna installation according to claim 1, wherein said conductive surface (49) is an oblong rectangle having a length (53) such that said surface (49) has a high capacitance value, and a blind resistance at an operating frequency which is low enough to create a high resistance impedance between the shielded conductor of the HF-cable and the body of the vehicle.

14. An antenna installation according to claim 13, wherein said rectangular conductive surface (49) is a meander-shaped structure for reducing the length of the rectangle.

15. The antenna installation according to claim 1, wherein said conductive surface (49) is an oblong rectangle having a length (53), and said antenna conductor connection point (19) is at one end of the rectangle and forms an electric line jointly with the conductive window frame (46), said electric line having a electric length such that a quarter wavelength in an operating frequency range is obtained within the dielectric adhesive, said electric line forming a low resistance connection between said second input contact (36) and said HF-mass reference point (34).

16. An antenna installation adapted for long-/medium-/short wave and television frequency ranges for installation in a motor vehicle windowpane having a conductive window frame and windowpane adhesive comprising:

at least one antenna conductor disposed on the windowpane;

an antenna conductor connection point located near the window frame and within the zone of the windowpane adhesive, said adhesive acting as a dielectric;

an electrical unit mounted on the windowpane and having a first input contact, a second input contact and a plurality of output contacts, said first input contact being connected to the antenna conductor connection point;

a receiving and transmitting unit;

a HF-cable having one end connected to one of said plurality of output contacts of the electrical unit and an opposite end connected to said receiving and transmitting unit, said HF-cable and said receiving and transmitting unit having an impedance;

a HF-mass reference point disposed on the conductive window frame, said antenna conductor having an impedance acting between said antenna connection point and the HF-mass reference point; and a low-resistance flat capacitive element comprising a rectangular conductive surface that is a meander shaped structure for reducing the length of the rectangle, said conductive surface being located within the zone of the HF-mass reference point and extending along an edge of the windowpane within the windowpane adhesive, said capacitive element being spaced apart from and electrically separated from the antenna conductor connection point, said element connecting said second input contact to the HF-mass reference point.

* * * * *